United States Patent [19]

Sato et al.

[11] 4,074,457
[45] Feb. 21, 1978

[54] INSECTS CATCHER ASSEMBLY

[75] Inventors: Hitoshi Sato; Hazime Watanabe; Kazumasa Miura, all of Kawaguchiko; Koji Kudo, Matsudo, all of Japan

[73] Assignee: Kawaguchiko Seimitsu Co., Ltd., Kawaguchiko, Japan

[21] Appl. No.: 685,928

[22] Filed: May 12, 1976

[30] Foreign Application Priority Data

May 12, 1975 Japan .................. 50-57126

[51] Int. Cl.² ............................................ A01M 1/04
[52] U.S. Cl. ........................................ 43/113; 43/114
[58] Field of Search ............... 43/113, 139, 114, 115, 43/116

[56] References Cited
U.S. PATENT DOCUMENTS

| 1,411,931 | 4/1922 | Pfeiffer, Sr. | 43/116 |
| 3,023,539 | 3/1962 | Emerson, Jr. | 43/113 |
| 3,108,391 | 10/1963 | Sipos | 43/113 |

FOREIGN PATENT DOCUMENTS

| 50-35778 | 4/1975 | Japan | 43/113 |

Primary Examiner—Russell R. Kinsey
Assistant Examiner—Peter K. Skiff
Attorney, Agent, or Firm—Fleit & Jacobson

[57] ABSTRACT

The insects catcher assembly of the present invention includes a framework. A fluorescent lamp is mounted within the framework for attracting flying insects theretowards. A sticky band strip led-out from a package and positioned in proximity to the lamp for stickingly catching the optically attracted insects. A collecting pan unit is detachably attached to the framework. The band strip is kept substantially parallel to the longitudinal direction of the pan unit and in a tensioned state in a vertical plane. The general appearance of the assembly is highly smart and elegant.

8 Claims, 12 Drawing Figures

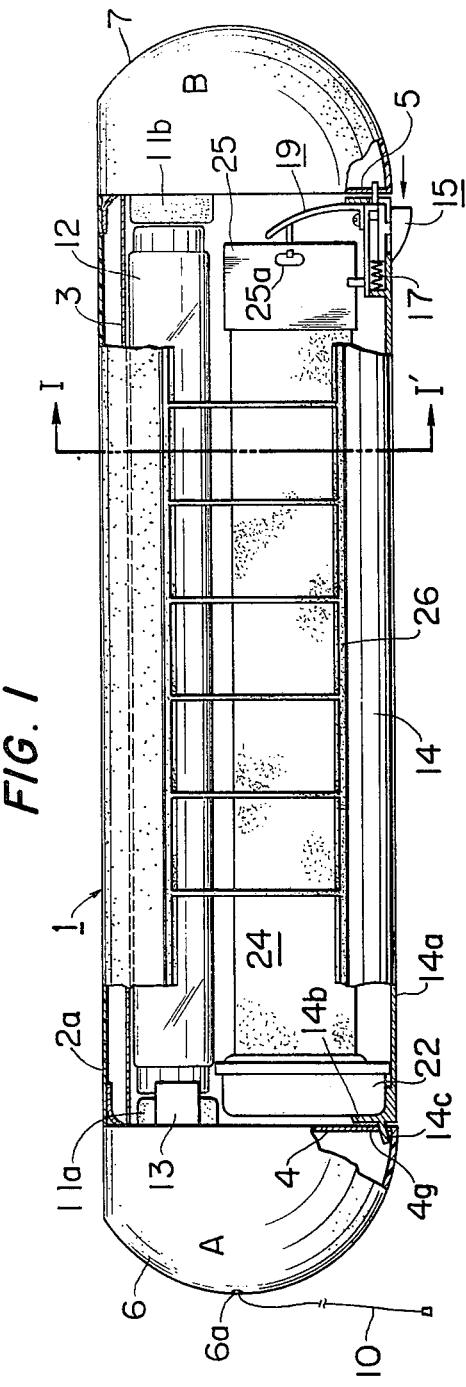
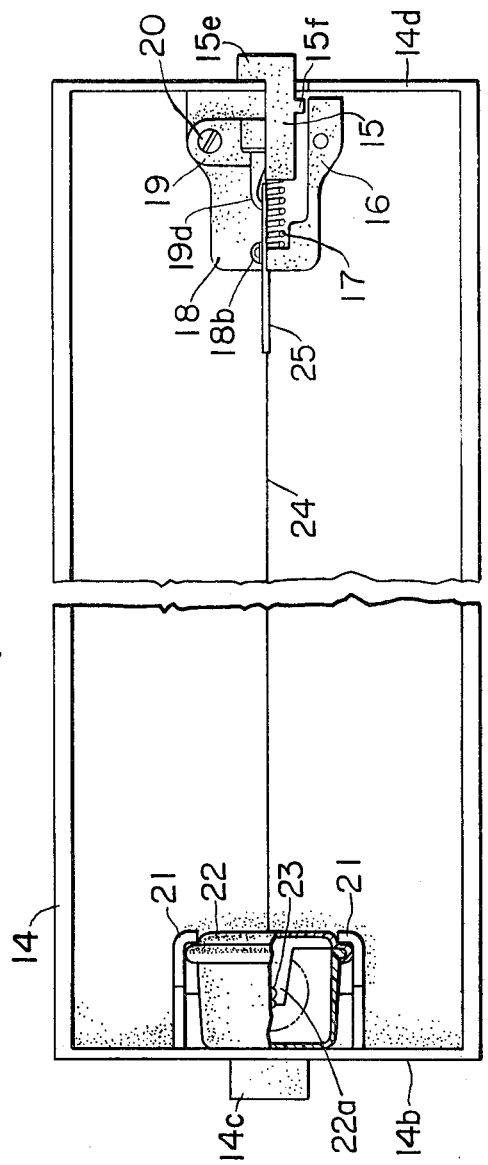
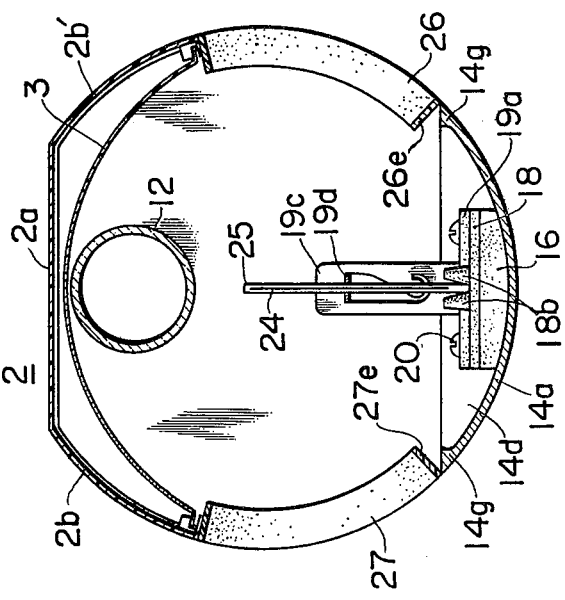
FIG. 1
FIG. 3
FIG. 2

4,074,457

INSECTS CATCHER ASSEMBLY

BACKGROUND OF THE INVENTION

This invention relates generally to improvements in and relating to winged insects-catchers by use of at least an incandescent lamp for optically attracting them theretowards. In addition, such catcher is provided with sticky band strip means for catching stickingly the thus optically attracted winged insects.

An object of the present invention is to provide an improved insects catcher of the above kind, capable of collecting dropped insects in a highly convenient, safe and smart manner.

A further object is to provide an improved insects catcher assembly of the above kind, wherein the sticky band tape is kept always in its tensioned state so far as it is kept at its working position.

Still a further object is to provide an improved assembly of the above kind which can be suspended at least at two different working positions.

A further object is to provide the assembly of the character referred to above, representing, however, generally a smart and elegant appearance.

These and further objects, features and advantages of the invention will become more apparent as the description proceeds in connection with substantially a preferred embodiment of the invention shown in the accompanying drawings.

In the drawings:

FIG. 1 is a partially broken-away front view of the insects catcher assembly according to the present invention, being shown in its suspended style from the ceiling of a room, not shown.

FIG. 2 is a slightly enlarged cross-sectional view of the assembly taken along a section line I—I′ shown in FIG. 1.

FIG. 3 is a partially broken-away and partially sectioned, slightly enlarged plan view of a insect bodies-receiving pan embodied in the inventive assembly.

Figure 4:
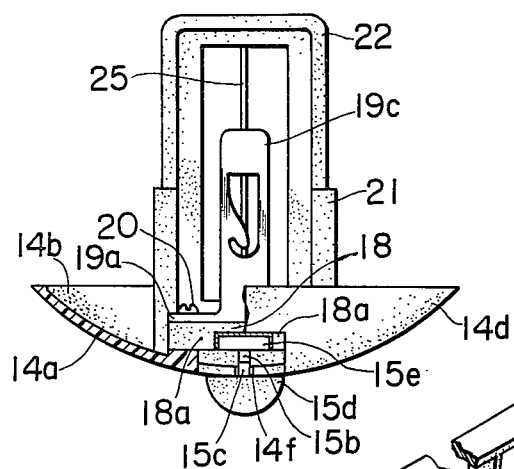
FIG. 4 is a partially sectioned right hand end of the pan shown in FIG. 3.

In the drawings, numeral 1 denotes generally a horizontally elongated casing of the insects catcher of the present invention. This casing 1 comprises a one-piece top cover 2 made of a metal or hard plastic resin material and having a flat top 2a and bulged-out stationary side wings 2b and 2b′ made integral with each other, as most clearly seen from its somewhat enlarged cross-section shown in FIG. 2.

Within the interior space of the top cover 2, there is provided a reflector plate 3 which may also be of metallic or plastics. If necessary, however, this reflector 3 can be dispensed with.

The both ends of top cover 2 as well as reflector 3 are fixedly attached to end plates 4 and 5, respectively, by means of several set screws, not shown.

Substantially semi-spherical hollow end cups 6 and 7 are attached to the outer surfaces of end plates 4 and 5, by means of set screws, not shown, the interior spaces of these hollow cups being utilized as respective electrical switch boxes "A" and "B" shown for containing switches, resistors and the like electrical circuit components.

Flat top 2a is formed through its panel plate with two separated pairs of small openings 8 and 9, respectively, for receiving suspension cords, ropes, chains or the like allowing the assembly 1 to be suspended as referred to hereinbefore, although not specifically shown. These ropes may also be hooked.

Within the left hand switch box "A", FIG. 1, being defined by left hand end plate 4 and its related hollow cup 6, a glow lamp socket is fixedly positioned at a relatively upper level on the end plate and a canopy switch is positioned at a middle level and on the same end plate, although not shown. From this canopy switch, a pulling cord 10 extends and goes out from the box interior through a central opening 6a to outside, for on-off control of the switch. As a main component of the right hand switch box "B", FIG. 1, there is provided a stabilizer, not shown, for the insects-attracting fluorescent lamp to be described.

A lamp socket 11a is fixedly provided on the inside surface of the left hand end plate 4 at a relatively upper level as shown in FIG. 1, while an opposite socket 11b is provided at the same level on the inside surface of right hand end plate 5 and the fluorescent lamp, shown at 12, is held in position in these sockets 11a and 11b.

Figure 7:
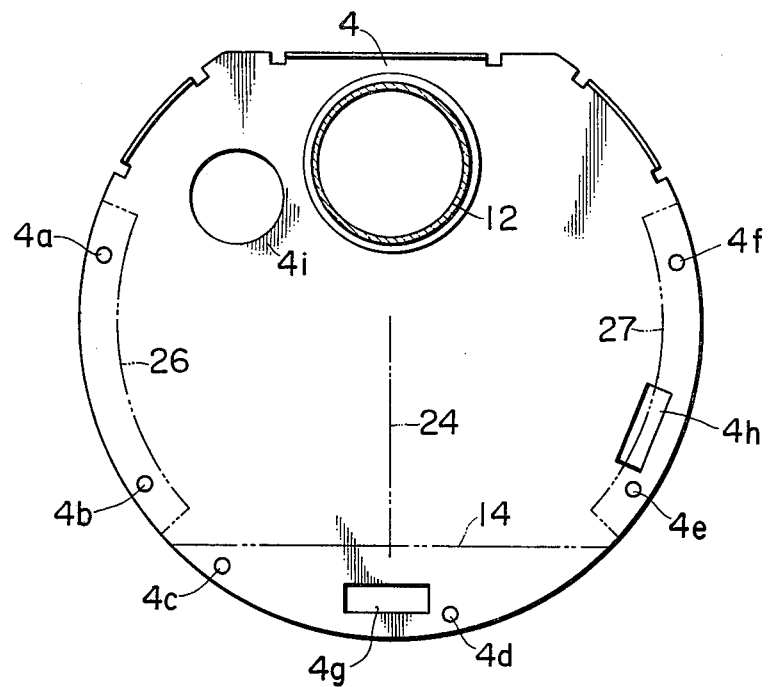
FIGS. 7 and 8 are respective elevational views of two end plates embodied in the assembly.

In FIG. 1, the glow lamp 13 is visible only partially, the said lamp extending horizontally from the interior of the box "A" through a corresponding socket (not shown) provided at substantially same level as the fluorescent lamp through the wall of left hand end plate 4. In FIG. 7, an opening 4i is shown which serves for mounting the glow lamp socket fixedly in position.

Numeral 14 represents a horizontally elongated pan, preferably made of plastics, having an arced cross-sectional configuration at 14a. At the left hand end of the pan 14 when seen in FIG. 1, there is provided an integral upright end wall 14b from which a hook projection 14c adapted for engagement with a horizontally elongated rectangular opening 4g, FIG. 7, formed through the related end wall of frame structure 1. The pan 14 is formed at its opposite end with a corresponding end wall 14d, a L-shaped opening 14e perforated commonly through pan bottom 14a and pan end wall 14d, as most clearly seen from FIG. 12.

Figure 11:
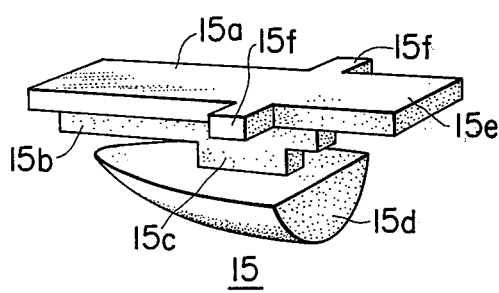
FIG. 11 is an enlarged partial view of FIG. 12.

Numeral 15 represents a slidable locking unit most clearly shown in FIG. 11. This unit 15 comprises a plane cross piece 15a, a horizontally elongated bar 15b having a smaller width than the cross piece and made integral with the lower surface of the latter and having a square or rectangular cross-section as shown, a depending stem 15c, having only a short length relative to the bar and made integral therewith, and a rigid boat-shaped member 15d made integral with the stem 15c.

Figure 12:
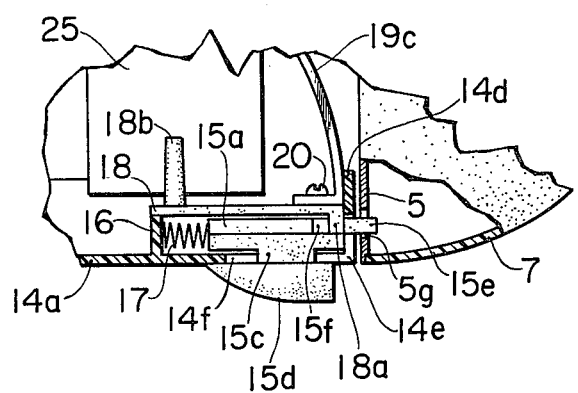
FIG. 12 is a somewhat enlarged perspective view of several small parts of the assembly shown in FIG. 1

The locking unit 15 is held in position, as most clearly shown in FIG. 12 in such a way that the stem 15c is slidably received in the horizontal portion 14f L-shaped opening 14e, thereby embracing part of the pan bottom wall 14a by and between the members 15b and 15d of the locking unit.

Numeral 16 represents a small upwardly opened box which is made integral with the pan bottom wall 14a.

Figure 8:
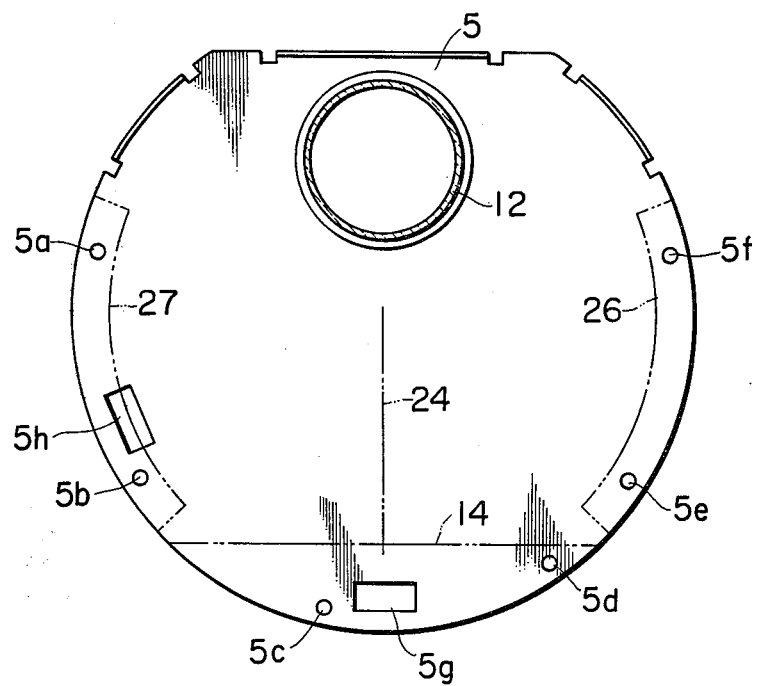

Numeral 17 denotes a compression spring which is so positioned as to resiliently push the unit 15 towards the switch box "B", thereby the longitudinally and outwardly extending tongue projection 15e of cross piece 15a projecting through a corresponding rectangular opening 5g perforated through the wall of end plate 5, shown most clearly in FIG. 8, into the interior space of the switch box "B" for fixing the related end of the pan 14 relative to the latter.

In this way, the pan is held firmly in position relative to the both end plates 4 and 5, and indeed, by means of the hook projection 14c and the tongue projection 15e of locking unit 15, respectively.

Figure 10:
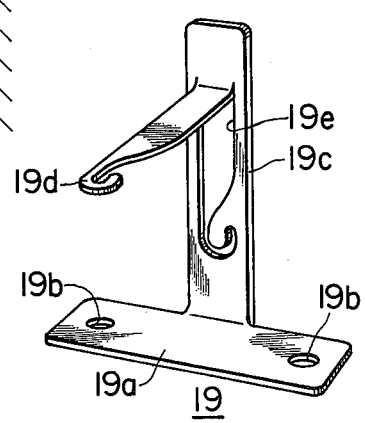
FIG. 10 is an enlarged perspective view of a resilient support hook for resiliently receiving one end of a stick tape adapted for catching incoming insects.

When the locking unit 15 is pushed manually and inwardly as shown by a small arrow shown in FIG. 1 by applying a small finger pressure upon the outer end of boat-shaped portion 15d of the locking unit 15, the engaging portion 15e is then disengaged from the receiving opening 5g of end plate 5. Then, the operator grips the portion 15d and applies his finger's downward pull, thereby the unit 15 being pushed out automatically from position under the influence of the return spring 17. At the same time, the left hand end of pan 14 is disengaged from the related end wall 5. In order to prevent the unit 15 from complete disengagement from the pan 14, a stationary cover member 18 positioned above the unit 15 is formed with a depending stop portion 18a which is adapted for contacting either lateral arms 15f of cross piece 15a of the unit 15 when the latter has been pushed resiliently out in the aforementioned way. The cover 18 and a resilient hook unit 19, most specifically shown in FIG. 10, are jointly attached fixedly upon the upper surface of the box portion 16 by means of set screws 20.

Hook unit 19 comprises a base strip 19a formed with two separated perforations 19b for receiving the set screws 20 adapted for the above fixing purpose, and a rising resilient stem 19c made integral with base strip 19a and a hook arm 19d partially punched out therefrom. The corresponding punched-out opening is shown at 19e in FIG. 10. The punched-out hook arm 19c extends substantially in the horizontal direction as shown.

Numeral 21 represents a stand-like holder, made of plastics resin material, and comprising two pillar elements of channel or angular cross section, vertically extending fixedly from the pan 14 for detachably receiving a package 22 containing a roll of a insects-catching strip tape 24 coated at its both surfaces with a known stick agent, not shown. The package 22 is provided therein with a rotatable reel shaft 23 which is rotatably supported at its both ends on respective bearing arms 22a rigidly extending from the inside surface of the package.

Only one of arms 22a is shown in FIG. 3.

The root end of strip tape 24 is attached to the reel shaft 23, while the opposite root lead-out end thereof is attached with a small lead-out plate piece 25 having a perforation 25a adapted for engagement with the hook arm 19d of hook support 19.

When such engagement is brought about between the lead-out plate 25 of insects-catching band strip 24 taken out from the package 22 and the hook arm 19d as shown in FIG. 3, the strip is kept in tension by virtue of the elastic structure of stem 19c of hook unit 19. The lead-out member 25 is prevented from its occasional turning movement from its working position by being guided by and between two stationary guides 18b contacting the lower region thereof and each taking the form of a vertically elongated frusto-conical pillar standing on the upper surface of said cover member 18.

When the band strip 24 should be changed with a new one, a finger pressure is applied endwise to the boat-like member 15 so as to disengage the locking unit 15 from position in the aforementioned way, thereby the corresponding end of pan 14 being inclined downwardly from position by its own gravity. Then, the operator manipulate the pan so as to disengage its hook portion 14c from the receiving opening 4g for bringing it into its free position from the frame 1, together with the package 22 with its lead-out band strip 24. Then, the old package can be exchanged with a new one.

In order to disengage the package with its lead-out band strip from the pan, the lead-out plate 25 is disengaged at its opening 25a from the hook portion 19d and then, the package 22 is taken out from its working position in engagement with holder 21 on the pan 14. In order to charge a new package, lead out the band strip and bring the latter into its tensioned working position as shown in FIG. 1, the reversed manipulations may be easily carried out. For re-attaching the pan, substantially reversed manipulations may be carried out.

Figure 5:
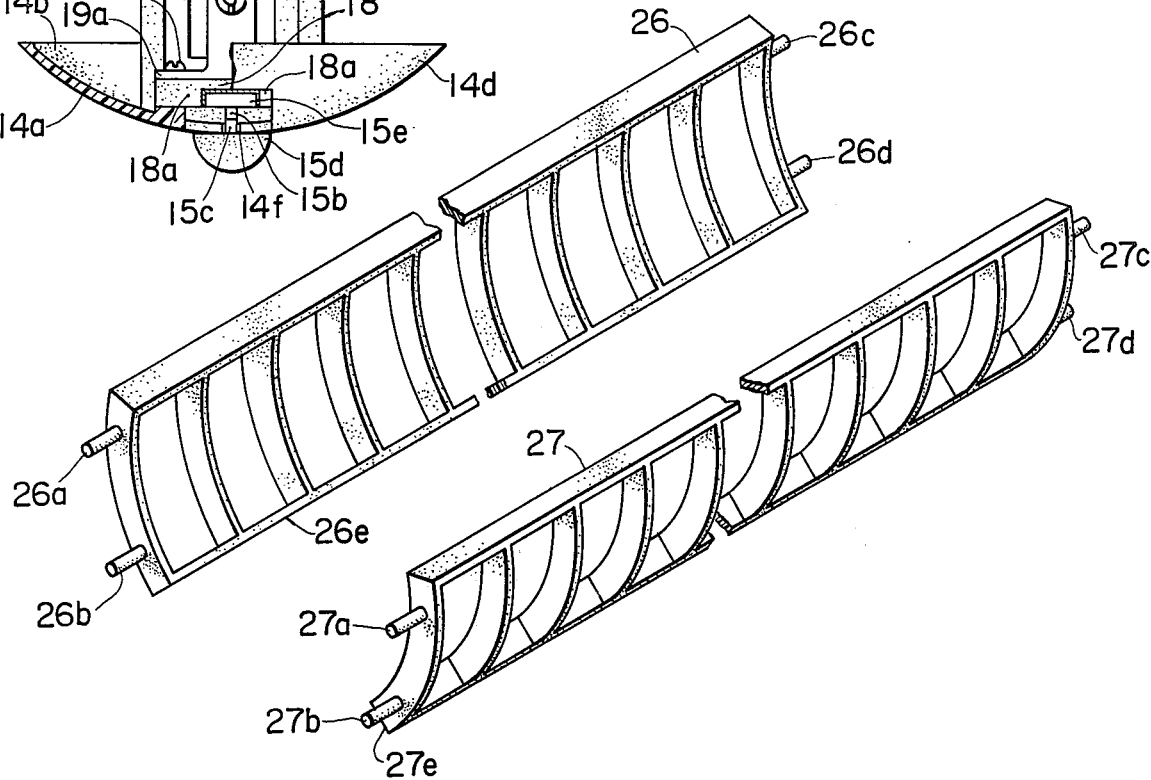
FIG. 5 is a perspective view of two frame window members taken out from the assembly shown in FIG. 1.

Numerals 26 and 27 represent lattice window members, respectively, which are most clearly seen from FIG. 5. Each of these window members is made of plastic resin material and represents a series of separated viewing openings and has an arc-shaped cross-section. First window member 26 is formed with two pairs of engageable pins 26a; 26b and 26c; 26d at its both ends, respectively, adapted for insertion into respective reception openings 4a; 4b of the end plate 4 and 5f; 5e of the opposite end plate 5. Second window member 27 is formed similarly with two pairs of engageable pins 27a; 27b and 27c; 27d at its both ends, respectively, adapted for insertion into respective reception openings 5a; 5b of the end plate 5 and 4f; 4e of the opposite end plate 4.

Figure 6:
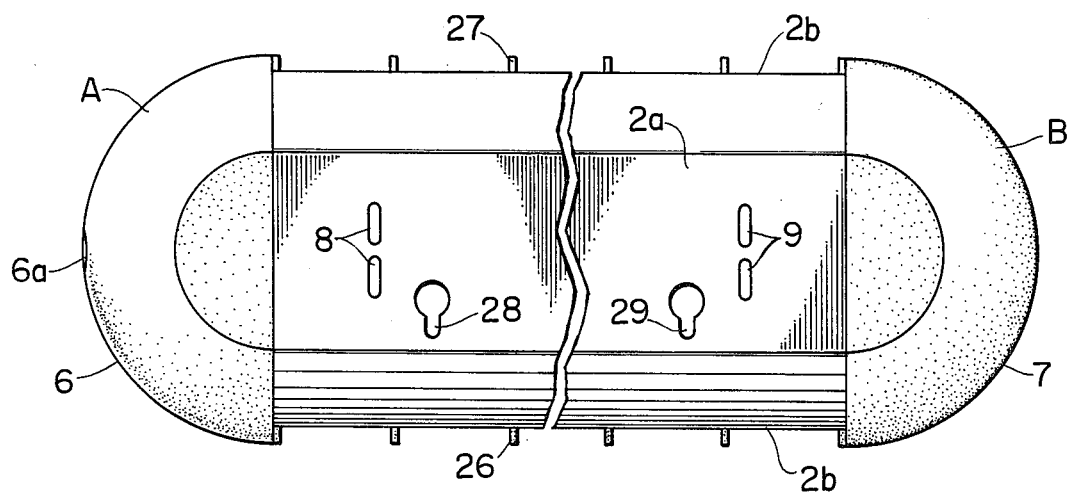
FIG. 6 is a partially omitted plan view of the assembly shown in FIG. 1 from which, however, several minor components have been removed for the purpose clear representation of several main constituents.
Figure 9:
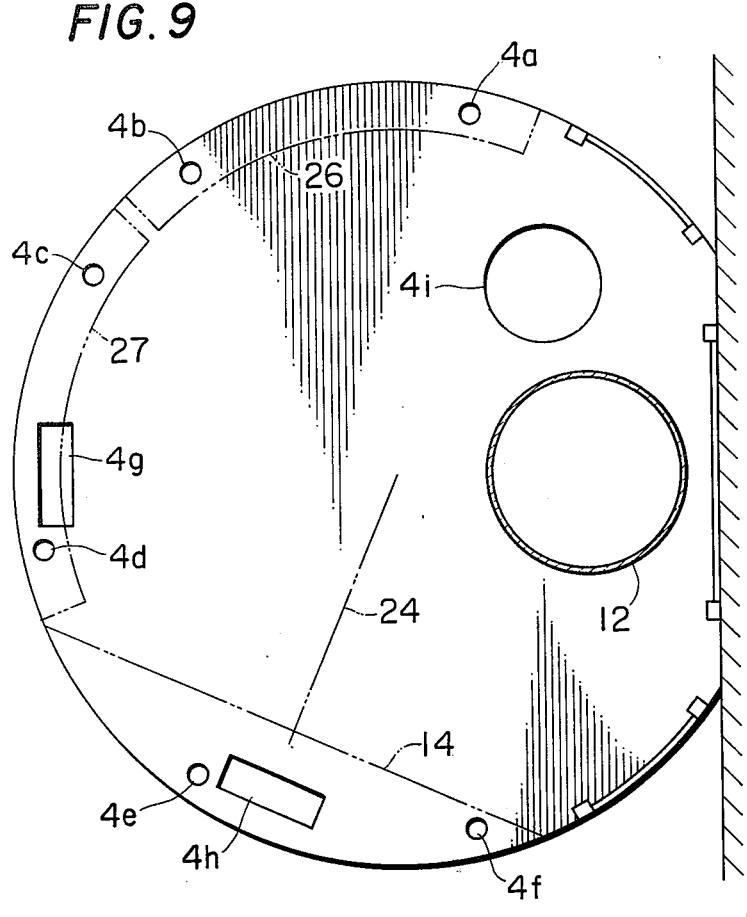
FIG. 9 is a slightly enlarged elevational view of one of the end plates somewhat modified for a wall hanging type assembly.

The insects catcher assembly according to this invention may be used in a wall-suspended mode as shown in FIG. 9. For this purpose, the ceiling-suspended mode of the assembly may be turned clockwise 90° from the position shown in FIG. 2. For the wall-suspended use, key hole openings 28 and 29, FIG. 6, are formed through the flat top plate 2a of top cover 2. These openings 28 and 29 are adapted for receiving pegs or the like projections, not shown, fixedly attached to the wall, only schematically shown at the right hand side of FIG. 9. In the thus modifiedly suspended style, the pan 14 must be shifted to a substantially lower position in the insects catcher assembly.

In this case, as hinted in FIG. 9, the hook projection 14c of pan 14 is kept in engagement with a newly provided rectangular opening 4h which occupies an angularly shifted position about 60° from the former similar opening 4g on the end plate 4, and the engageable pins 27a; 27b of window member 27 are kept in engagement with new reception openings 4d; 4c, respectively, which are angularly shifted equally from those previously utilized. On the other hand, the other window member 26 may occupy its hitherto attached position. The insects once stickingly caught by the extended and tensioned band strip 24 may drop downwards upon lapse of certain short time duration after leaving their wings stuck on the sticky surface of the strip. The pan will serve for collecting these dropped insect bodies which may assembled into a mass by virtue of attached sticky substance to these bodies.

The pan 14 is formed at its upper edges with respective inward projections 14g which serve for successful prevention of escapement of the dropped insects which may be alive for the time being on the pan 14. For larger insects, the lower edge surfaces 26e; 27e of window members 26; 27 may well serve as the escapement prevention stop means for the similar purpose.

As clearly noted from the foregoing disclosure, since the insects catcher assembly according to this invention comprises a framework and a insect bodies-collecting pan mounting detachably an insects catching sticky strip tape and its package and detachably attached in turn to the framework, the package and the lead-out strip tape therefrom can be conveniently exchanged with a new one upon dismantling the pan from the framework and displacing it from its overhead working position to a conveniently manipulating position.

In addition, there is no fear of dropping the dead insect bodies out of the pan, thereby the catcher assembly presenting permanently a neat appearance even during an extended use thereof. Further, since the sticky catcher band is mounted on the collecting pan and positioned within the interior space of the assembly, occasional direct contact of hair and hands of the user with the sticky band strip could be substantially be avoided.

By adopting the attaching position of the two window frame members variable at different positions relative to the main framework, the assembly may easily and conveniently take two or more different suspended positions as occasion may desire.

Although not specifically described, the number of incandescent lamps should not be construed as only one, and it can be increased to a desired plural if occasion may desire and by slight modification of related parts of the assembly as easily thought out by any person skilled in the art.

The embodiments of the invention in which an exclusive property or privilege is claimed are as follows:

1. In an insects catcher assembly comprising a framework, fluorescent lamp means mounted within the framework for attracting flying insects theretowards and a sticky insects catcher band strip positioned in proximity to said fluorescent lamp means, the improvement comprising:
a pan extending longitudinally with respect to said lamp for collecting insect bodies and being adapted to be detachably attached to the framework; and holding means extending upwardly from both ends of said pan for holding the sticky insects catcher band strip under tension in a working position substantially parallel to said longitudinal direction of said pan.

2. The insects catcher assembly of claim 1, wherein an end plate is provided at each end portion of said framework and a switch box is attached to each of these end plates, each of said switch boxes being formed into a flat top, semispherical container.

3. The insects catcher assembly of claim 2, wherein two elongated window members are detachably attached at the both ends thereof to said end plates so as to complement the overall outer configuration of said framework.

4. The insects catcher assembly of claim 3, wherein the pan and the window members are capable of taking at least two different jointly working positions relative to the framework.

5. The insects catcher assembly of claim 4 wherein the framework includes openings adapted to receive means for mounting the insects catcher assembly on a wall and openings adapted to receive means for suspending the insect catcher assembly from a ceiling.

6. The insects catcher assembly of claim 1 wherein the sticky insects catcher band strip is supplied in a package with the root end of the strip secured within the package and the other end of the strip attached to an engagable plate piece extending from the package and wherein the holding means extending upwardly from both ends of said pan includes first means at one end of said pan for holding the package and second means including a hook unit at the other end of said pan for resiliently engaging the engagable plate piece, said first means holding the package in such manner that the package cooperates with said second means to hold under tension the sticky insects catcher band strip extending from the package to said second means.

7. The insects catcher assembly of claim 6 wherein said second means further includes means for limiting axial rotary movement of the sticky insects catcher band strip engaged by said hook unit.

8. The insects catcher assembly of claim 1 wherein the framework includes at each end an end plate containing openings for engaging a respective end of said pan and wherein said assembly further comprises hook means extending from one end of said pan and engageable with an opening contained in one of the end plates and sliding locking means extending from the other end of the pan and being biasable into engagement with an opening in the other end plate, said pan being detachably attached to said framework by the engagement of said hook means and said sliding locking means with the openings in the end plates.

* * * * *